June 12, 1934.                D. G. BAKER                1,962,757
                           WINDING MACHINE
                         Filed July 28, 1928            8 Sheets-Sheet 2

INVENTOR
D. G. BAKER
BY
ATTORNEYS

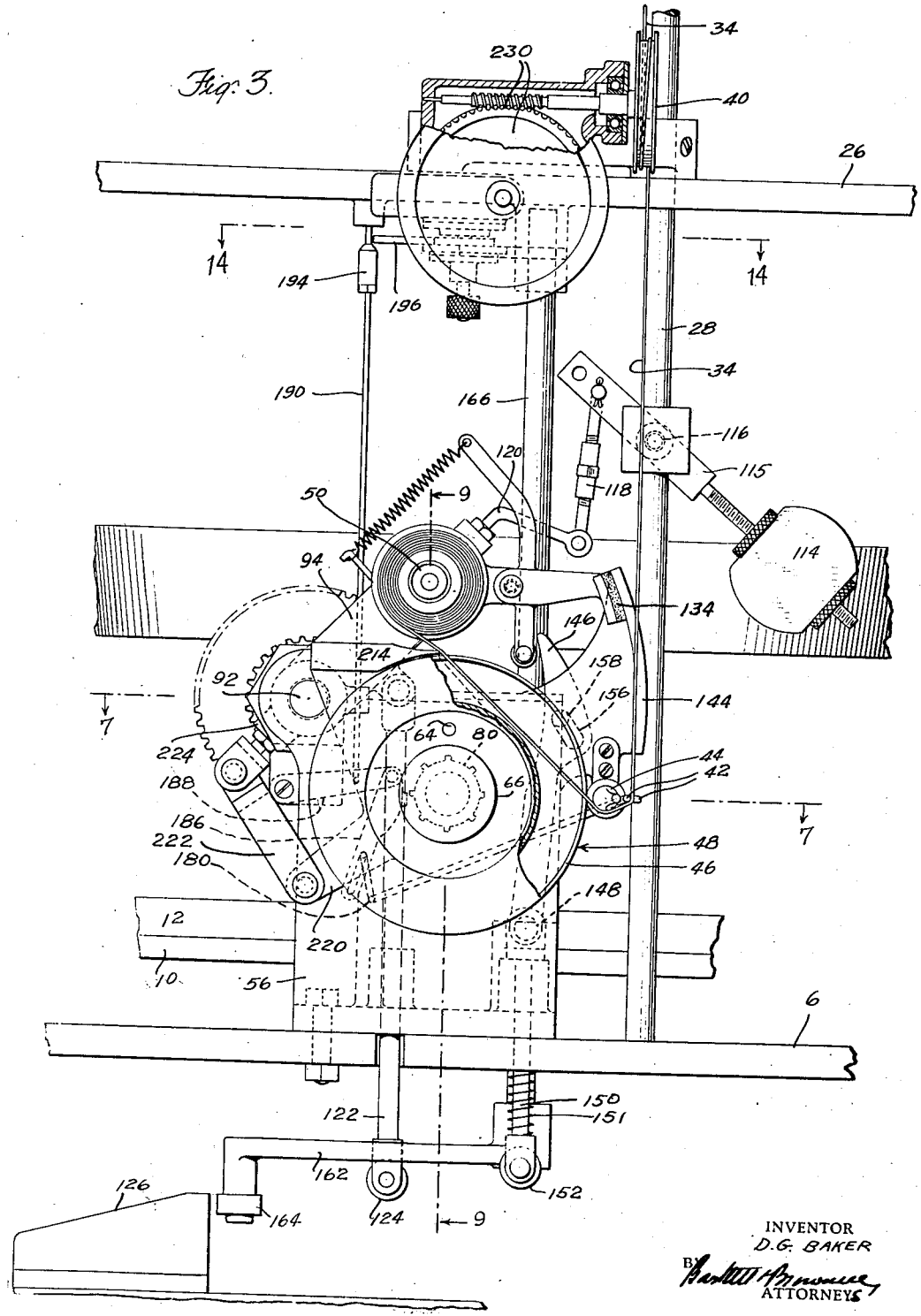

June 12, 1934.    D. G. BAKER    1,962,757
WINDING MACHINE
Filed July 28, 1928    8 Sheets-Sheet 4
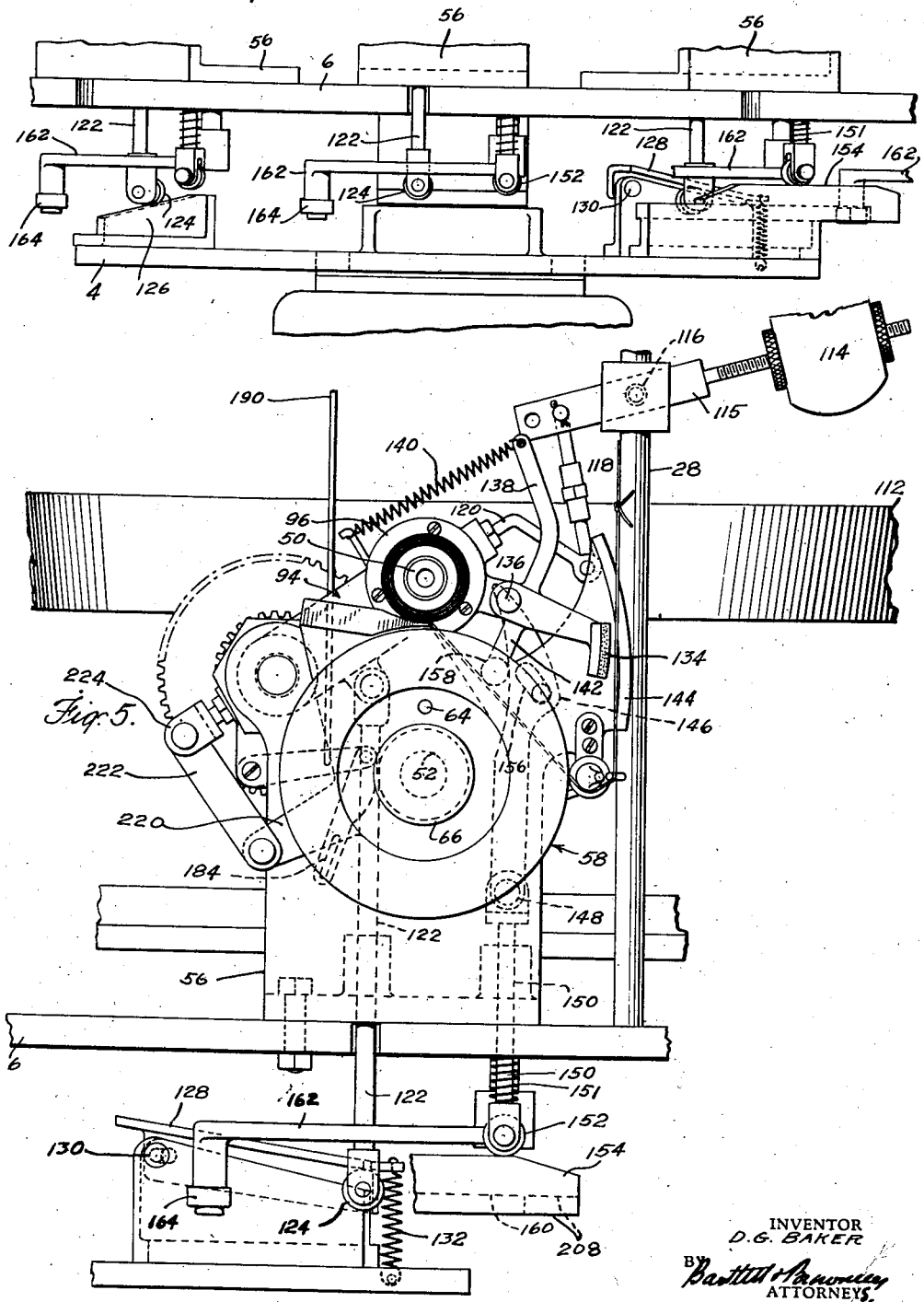

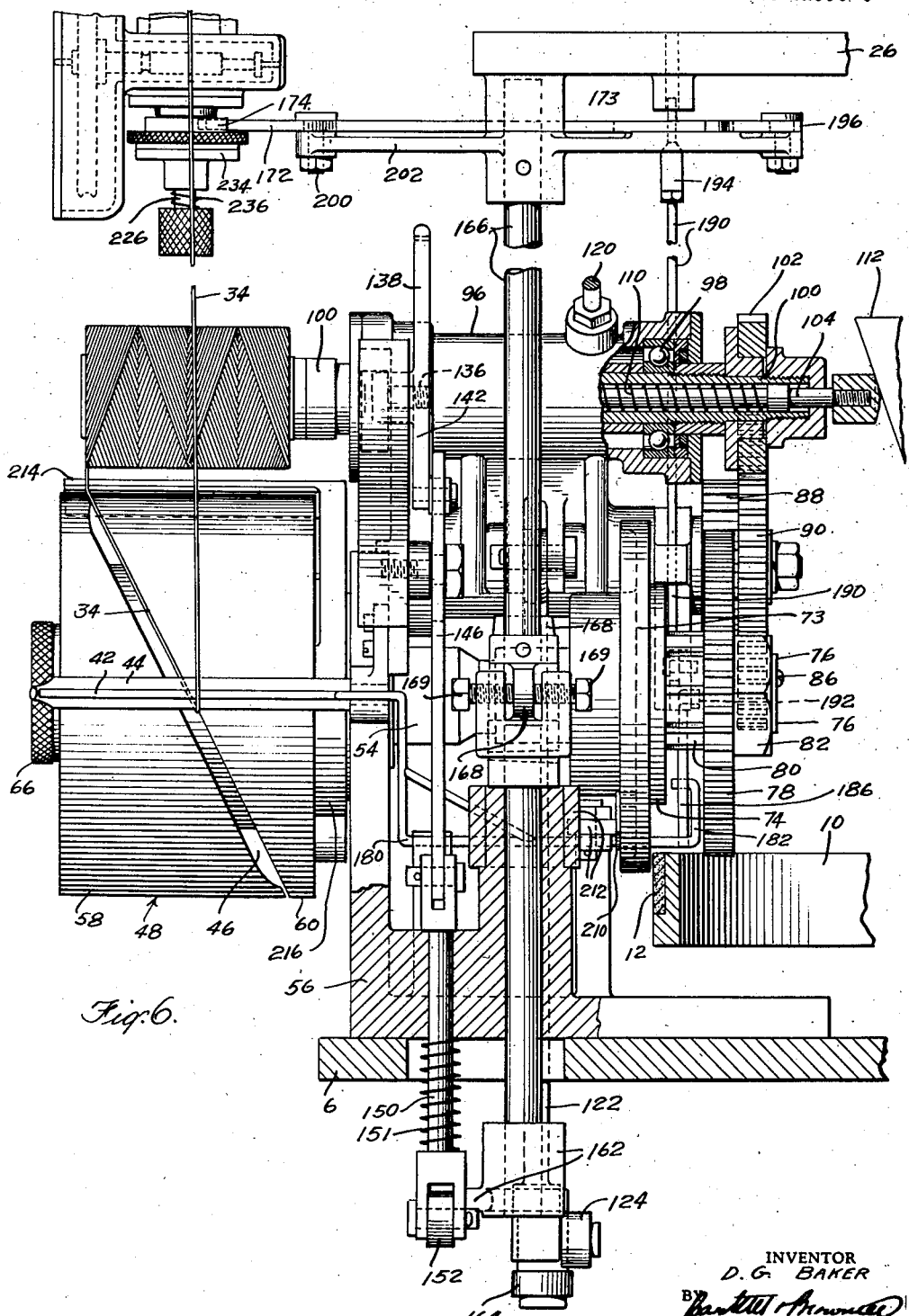

June 12, 1934.  D. G. BAKER  1,962,757
WINDING MACHINE
Filed July 28, 1928   8 Sheets-Sheet 6

INVENTOR
D.G. BAKER
BY
ATTORNEYS

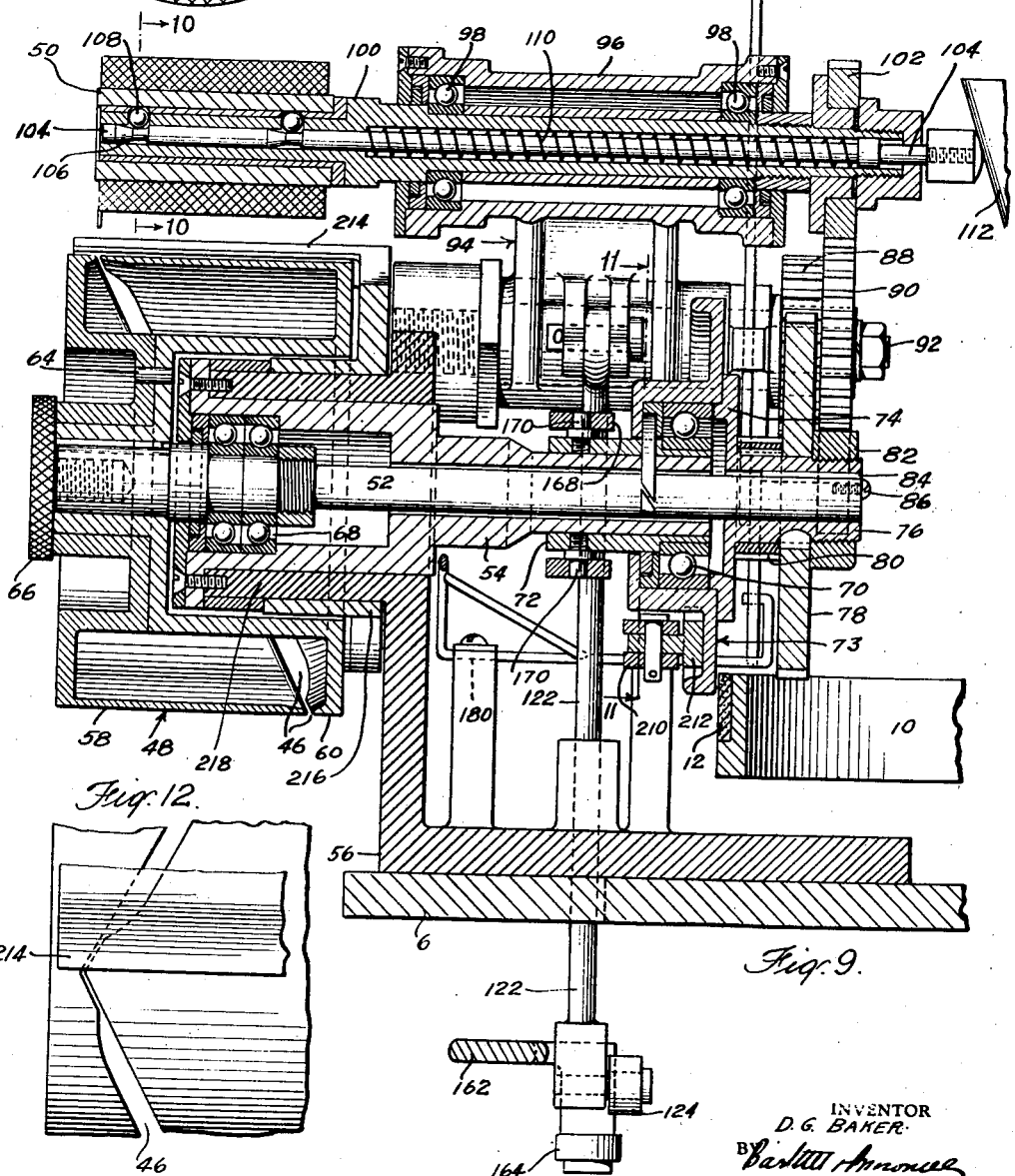

June 12, 1934.  D. G. BAKER  1,962,757
WINDING MACHINE
Filed July 28, 1928   8 Sheets-Sheet 8
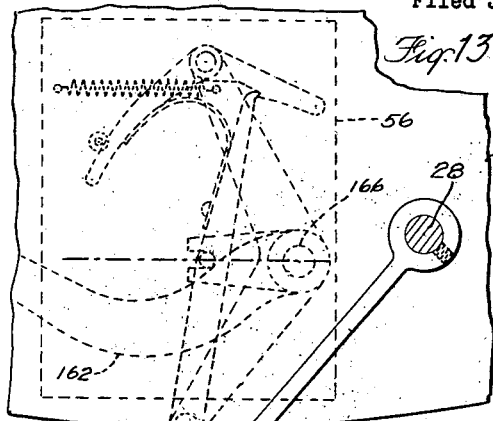
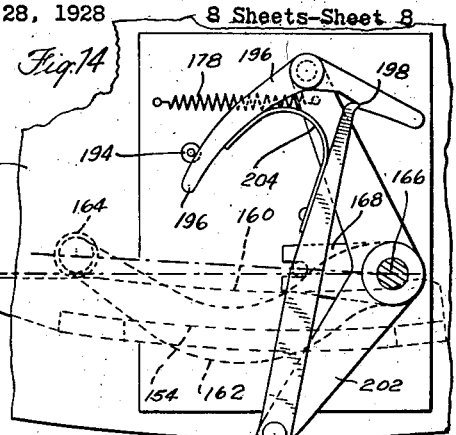
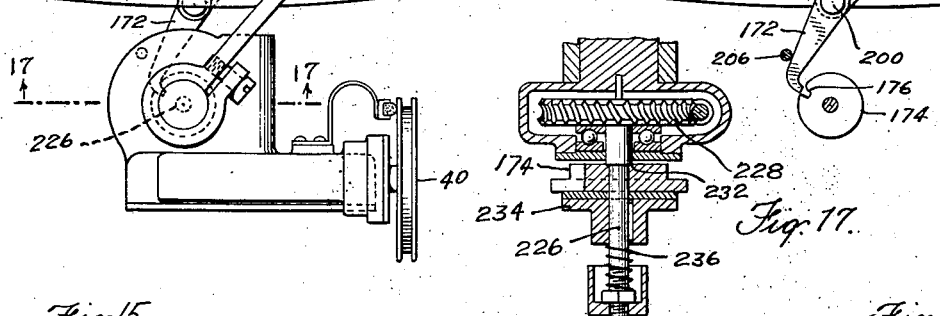
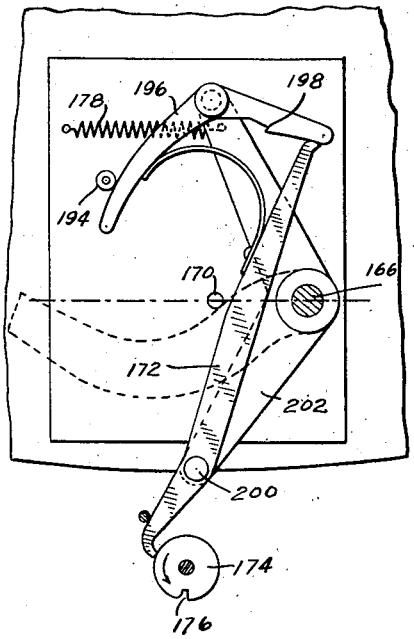
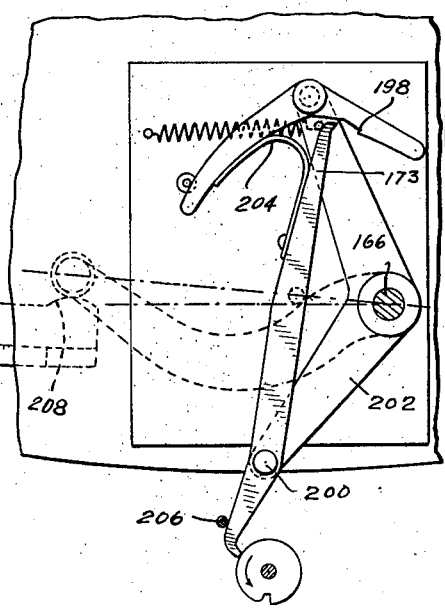
INVENTOR
D. G. BAKER
ATTORNEYS Patented June 12, 1934

1,962,757

UNITED STATES PATENT OFFICE 1,962,757

WINDING MACHINE

Dickerson G. Baker, Holyoke, Mass., assignor to The American Thread Company, New York, N. Y., a corporation of New Jersey Application July 28, 1928, Serial No. 295,866

26 Claims. (Cl. 242—36)

My invention relates to winding machines and has for its object to provide a new and improved machine for winding thread. It further has for its object to provide an improved continuously running machine for winding a plurality of cops from which completed packages can be removed and fresh mandrels can be supplied, one at a time, by an operator stationed at a given point, the packages being wound constituting a series in different stages of completion. It further has for its object to provide a new and improved machine for forming thread packages or cops in which the winding action of any head is automatically stopped after a predetermined yardage has been wound thereby. It further has for its object to provide a new and improved machine in which a winding spindle is automatically stopped when the thread being wound thereon breaks. It further has for its object to provide a machine in which a package having the proper yardage can be completed in case the thread breaks and is subsequently tied. It further has for its object to provide a new and improved self-threading guide for laying the thread upon a mandrel and building up the package. It further has for its object to provide a machine for winding a series of cops, any winding element of which can be thrown out of action when desired without affecting the other winding elements. It further has for its object to provide a new and improved thread measuring device throwing a winding element out of operation after a predetermined yardage has been wound. It further has for its object to accomplish other new results, hereinafter described.

The following is a description of an embodiment of my invention reference being had to the accompanying drawings, in which:

Fig. 3 is a front elevation of one of the winding elements and associated parts, the parts of the winding element being in the position which they occupy when the package is ready to be doffed;

Fig. 4 is a front elevation of portions of the turret table and certain operating cams and parts actuated thereby;

Fig. 5 is a front view of one of the winding elements which is about to be thrown into operation. This figure shows a partially wound bobbin, the rotation of which has been stopped by the breaking of the thread, which thread has been subsequently tied;

Fig. 6 shows a side elevation of one of the winding elements with parts in section;

Fig. 9 shows a vertical section of a winding element on the line 9—9, Fig. 3;

Fig. 10 shows a sectional detail on the line 10—10, Fig. 9;

Fig. 11 shows a sectional detail on the line 11—11, Fig. 9;

Fig. 12 shows a fragmental portion of the rotary guide thread separator;

Fig. 13 shows a plan view of the thread measuring device and knock-off elements controlled thereby;

Fig. 14 shows certain knock-off elements controlled by the thread measuring device, the same being on the line 14—14, Fig. 3, the parts being in position for starting winding;

Fig. 15 shows part of these knock-off elements in the position assumed upon the breaking of a thread;

Fig. 16 shows the elements of Fig. 14 shortly after the winding has been resumed; and Fig. 17 shows a section on the line 17—17, Fig. 13.

Figure 1:
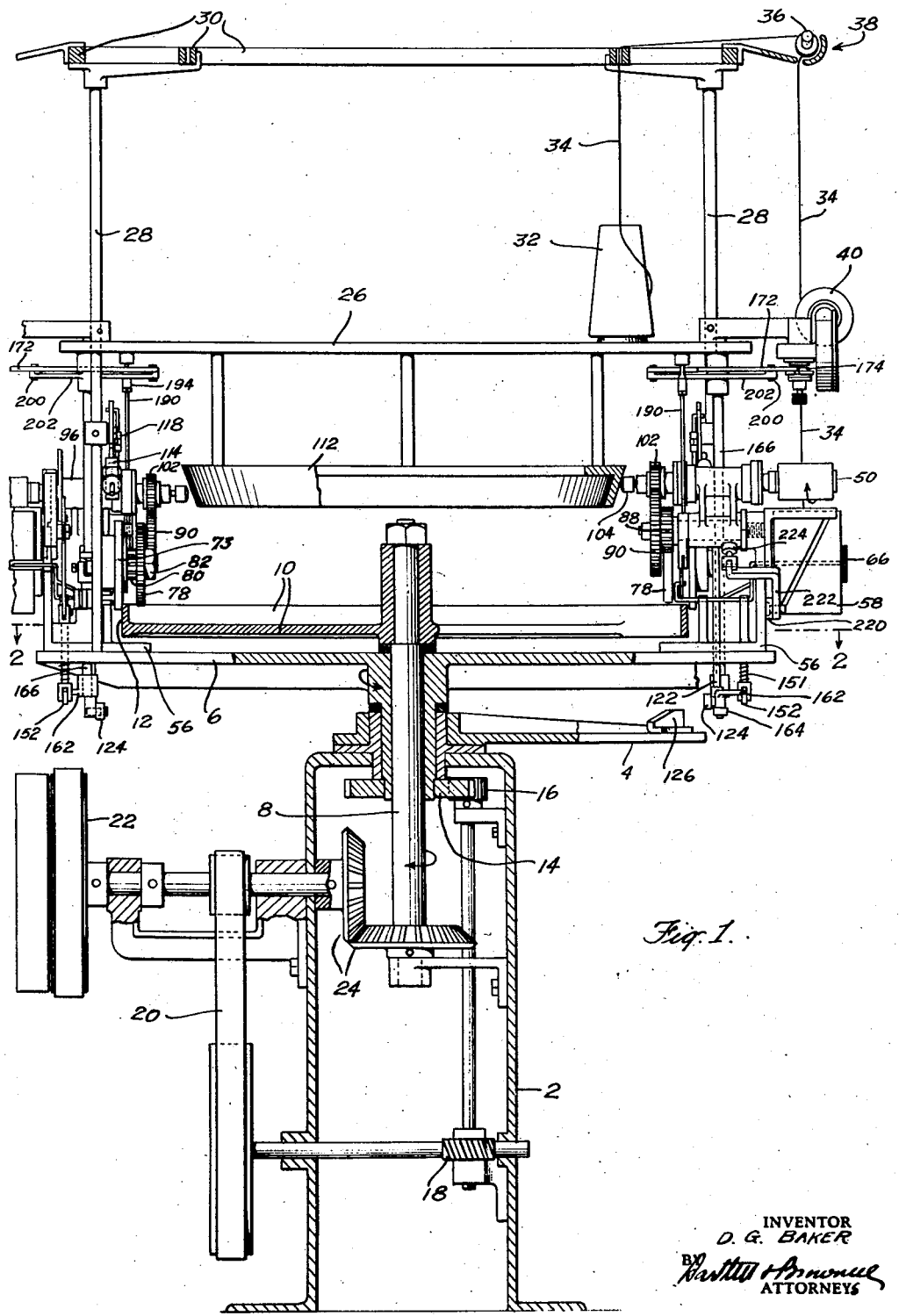
Figure 1 shows partly in side elevation and partly in section a winding machine embodying my invention, the same having a turret carrying a plurality of winding heads or elements.

Referring more particularly to the drawings, Fig. 1, 2 is the stationary base of the machine carrying a fixed cam plate 4 and a rotatable turret table 6 through which passes a vertical rotatable shaft 8 carrying upon its upper end a frictional drive wheel 10 preferably provided with a friction driving face 12 of yielding material such as leather, as shown in Figs. 6 and 9. The turret table 6 carries twelve equally spaced winding heads or elements and is revolved by gears 14 and 16, the latter of which is driven through worm gearing 18 by a belt and pulley connection 20 driven by the main pulley 22. The shaft of this main pulley through bevel gears 24 drives the shaft 8 and rotates the friction wheel 10 for purposes hereafter described. By these connections the table 6 is rotated slowly while the wheel 10 is rotated at a rapid rate. At normal running speed the table 6 makes one revolution in two minutes. As any head moves through 360 degrees a package, under normal conditions, is completely wound and removed so that the machine delivers twelve wound packages every two minutes.

Above the turret table and rotating therewith is a supply table 26 supported by the turret table through twelve rods 28 which extend through the supply table and support two rings 30 on the upper end of the machine. The supply table 26 supports a series of twelve conical cops 32 only one of which is shown. A thread 34 from each cop passes upward through a corresponding guide opening in the ring 30 and then into contact with and partially around a revolvable wax disk 36 in a waxing device 38 and then downward to the drive wheel 40 of one of the thread measuring devices which are secured as shown to the rods 28. The thread then passes downward, as shown in Fig. 3, beneath the control element 42 of the knock-off device, to be hereinafter described, and a rod guide 44 and thence through a slit 46 in a self-threading rotary guide 48 to a mandrel 50 upon the winding spindle.

*Winding heads:*—Twelve winding elements are secured to the table 6, as shown in Figs. 3 and 5. Each winding head is provided with a shaft 52 mounted within a hollow trunnion 54 secured to the base 56 of the winding head, Fig. 9. This shaft carries on its forward end a self-threading rotary thread guide composed of two parts 58 and 60 having between their opposing faces an inclined thread guide slot 46. The inner member 60 in splined to the shaft and the outer member 58 is secured in proper angular relation thereto by a dowel pin 64, being held against longitudinal movement by the headed screw 66. With this construction the outer member can be easily removed for cleaning the guide, when desired. 68 is an internal ball-bearing for the outer end of the shaft 52 and 70 is an external ball-bearing for the inner end. The inner raceway of the ball-bearing 70 is carried by a bushing 72 slidingly mounted on the inner end of the trunnion 54. The outer raceway of the ball-bearing 70 is connected to the shaft 52 by a friction disk 73 adapted to engage and disengage the friction surface 12 on the drive wheel 10 which disk is positively secured to a flange 74 on a bushing 76 which carries a gear 78 and a star cam 80 which are clamped in fixed position about the bushing 76 by a clamping nut 82. The bushing 76 is connected to the shaft 52 by a sliding spline 84, which is kept within its socket by a screw 86. With this construction the friction disk 73 can be moved longitudinally so as to engage and disengage the friction surface 12 of the drive wheel 10 without moving the shaft 52. The gear 78 meshes with the gear 88 which is connected to a larger gear 90 both being idle gears mounted upon the stud 92. Pivotally mounted upon this stud 92 is a bracket 94, Figs. 5, 6 and 9, having a housing 96 carrying ball-bearings 98, Fig. 9, in which is mounted a hollow winding spindle shaft 100, having a driving gear 102 meshing with the gear 90 so that the spindle can be moved toward and from the shaft 52 and the self-threading thread guide. With this arrangement the relations of the gears 90 and 102 are not changed by any movement of the driving spindle toward and from the thread guide. The gears 78 and 102 are so related to the traverse guide as to produce a universal wind. The gears can be changed for threads of different diameters.

The winding spindle is provided with a ball-clutch for holding the hollow mandrel 50 in place, the same consisting of a rod 104 having cam surfaces 106 acting on balls 108 so that when the rod 104 is moved inward the balls 106 engage the inner surface of the mandrel and when moved outward are withdrawn therefrom, Fig. 9. The spring 110 tends to move the rod 104 inward to mandrel-clutching position and does so when the spindle 100 is depressed into winding position.

In order to release the clutch when the spindle is in raised position I provide a cam surface 112 which rotates with the turret table and acts to force the rod 104 outward when the spindle is raised, as shown in Fig. 9, so as to release the mandrel.

*Head controlling means.*—The weight of the bracket 94 and the spindle together with the package being wound is nearly counter-balanced by a weight 114 carried by a lever 115 pivoted at 116 and connected by an adjustable link 118 to an extension 120 from the upper end of the housing 96, Figs. 3 and 5. The counter-balancing of the weight 114 increases as the package increases in size, the lever 115 being elevated as in Fig. 5 during the first part of the winding and more nearly approach horizontal position when the winding is completed.

In order to move the bracket 94 positively I provide a rod 122, Figs. 3 and 5, pivotally connected thereto and terminating in an anti-friction roller 124 and provide two cams 126 and 128 mounted upon the arm 4, the first of which after the head reaches package-completing position, raises the bracket 94 upward to the position shown in Fig. 3 in which position the package can be doffed and a new mandrel applied. The second cam, shown in Figs. 4 and 5 engages the upper surface of the roller 124 pulling the rod 122 downward and causing the bracket 94 to move toward the rotary guide. This downward movement sometimes takes place when a mandrel is partially wound, such for instance, as when the thread has been broken before the package has been completed so that the amount of downward movement of the winding spindle varies. In order to provide for a case where the package is partially wound during this downward movement, I pivot the cam 128 at its upper end 130 and attach to its lower end a spring 132 whose other end is secured to a fixed abutment so that the cam 128 while it will pull the bracket 94 downward will yield to compensate for a partially wound package which may be upon the winding spindle during its action, Fig. 5.

When a head has nearly completed its cycle and reached a point where the full yardage should have been wound thereon, the bracket 94 is positively raised by the action of the cam 126 engaging the lower surface of the roller 124, Fig. 4. This cam 126 acting through the roller 124 forces the bracket 94 upward to the position shown in Fig. 3 and at the right of Fig. 1. In order to supply a friction which shall steady the spindle during the winding of the package I provide a brake-shoe 134 pivoted to the bracket 94 at 136, Fig. 5, and having an upwardly extending arm 138 to which is connected a tension spring 140 and also a depending arm 142 on the end of which is mounted an anti-friction roll. During the winding operation the brake 134 engages a segment 144 but when the arm 96 is to be drawn out from the position shown in Fig. 3 the shoe 134 must be disengaged from the segment 144 and for that purpose I provide a brake retractor 146 pivotally mounted at 148 to a plunger 150 having an anti-friction roller 152 which at the proper time engages a cam 154 carried by the arm 4, Fig. 4. This plunger 150 is held in downward retracted position by a compression spring 151. The retractor head 146 is provided with an inclined slot 156 surrounding a pin 158 fixed to the stationary friction segment. As the cam 154 forces the plunger 150 upward the retractor 146 engages and moves the arm carrying the roller 142 so as to withdraw the shoe 134 and the segment 144 being held in that position while the cam 128 draws the bracket 94 down to winding position.

Figure 2:
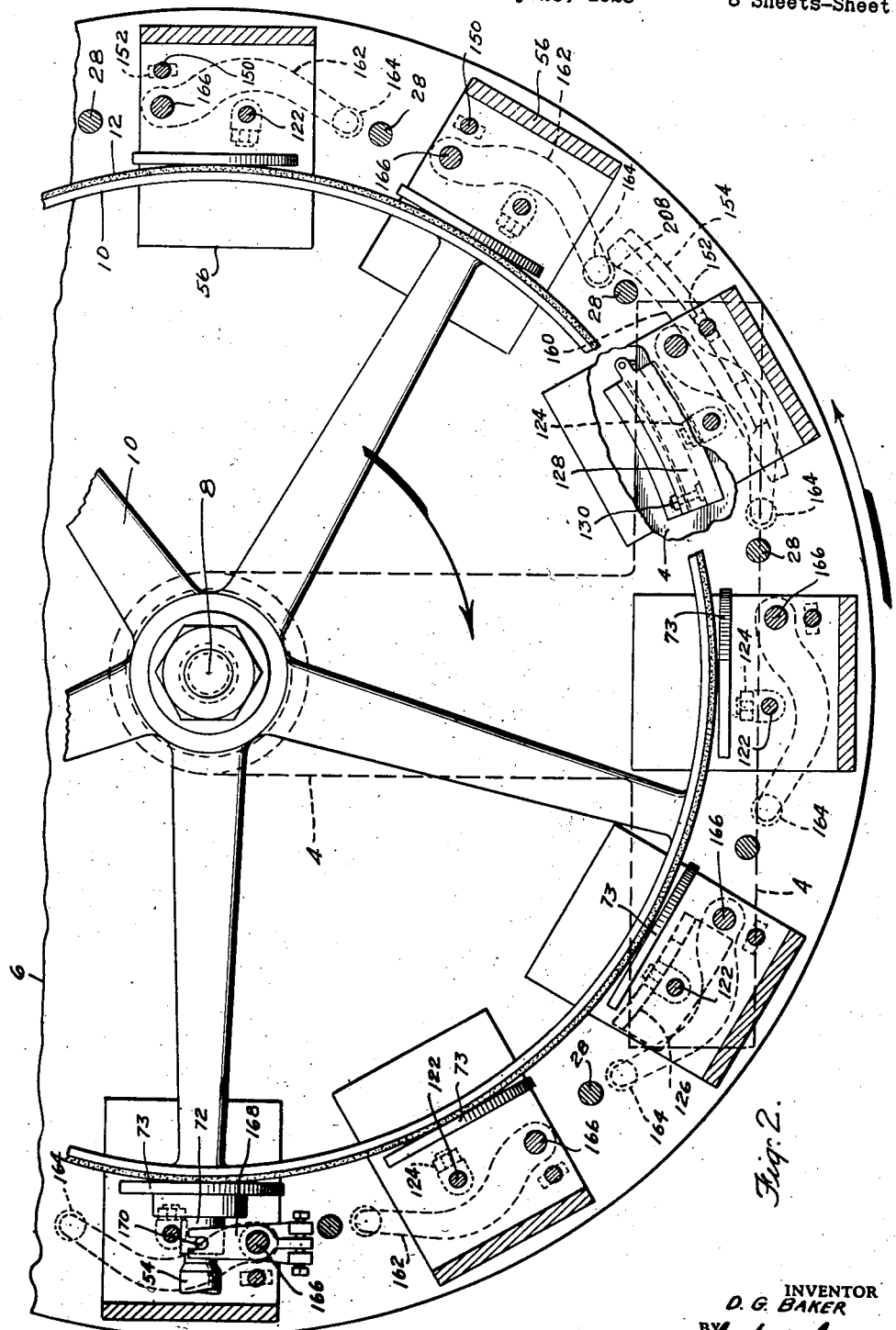
Fig. 2 is a section taken on the line 2—2 of Fig. 1, showing the turret carrying the winding elements and a friction drive for the several winding elements.

In order to start and stop the head I provide a fourth cam surface 160 on the inner side of the cam 154, Figs. 2 and 4, and provide a lever arm 162 having an anti-friction roller 164 rigidly connected to a vertical oscillating rod 166 which carries a yoke 168 having a slot which engages a pin 170 on the sliding bushing 72. When the cam surface 160 is engaged by the roller 164, the yoke 168 causes the friction disk 73 to engage the friction surface 12 on the drive wheel 10 so as to start the head in operation. The disk 73 is held in drive-wheel engaging position by a pawl 172 engaging the periphery of a timing disk 174 actuated by the thread measuring device, Figs. 13 to 16. This timing disk has a notch 176 and the pawl 172 being normally rigidly connected to the shaft 166 as hereinafter described, holds the friction disk 73 in contact with the surface 12 so long as it engages the periphery of the timing disk 174, so that after the lever 162 is no longer controlled by the cam surface 160 the friction disk is held in driving engagement by the timing disk 174 by reason of the fact that the timing disk notch 176 is permitted to turn away sufficiently from pawl 172 by the length of the cam 160 controlling lever 162. When, however, the notch 176 is in alinement with the end of the pawl 172 and the lever 162 has not come into engagement with the cam 160, the lever 172 permits the friction disk to withdraw from the surface 12 and such withdrawal takes place under the action of the spring 178, Fig. 13, stopping the head when the full yardage has been wound.

Figure 7:
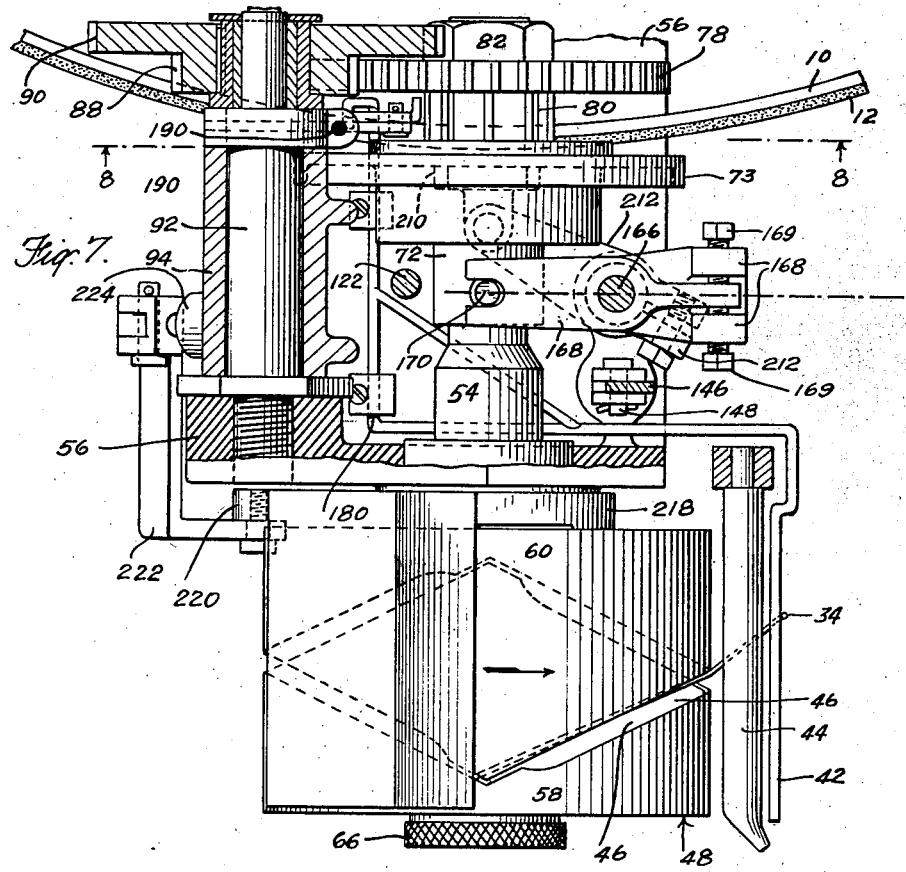
Fig. 7 shows a view partially in section on the broken line 7—7 of Fig. 3.
Figure 8:
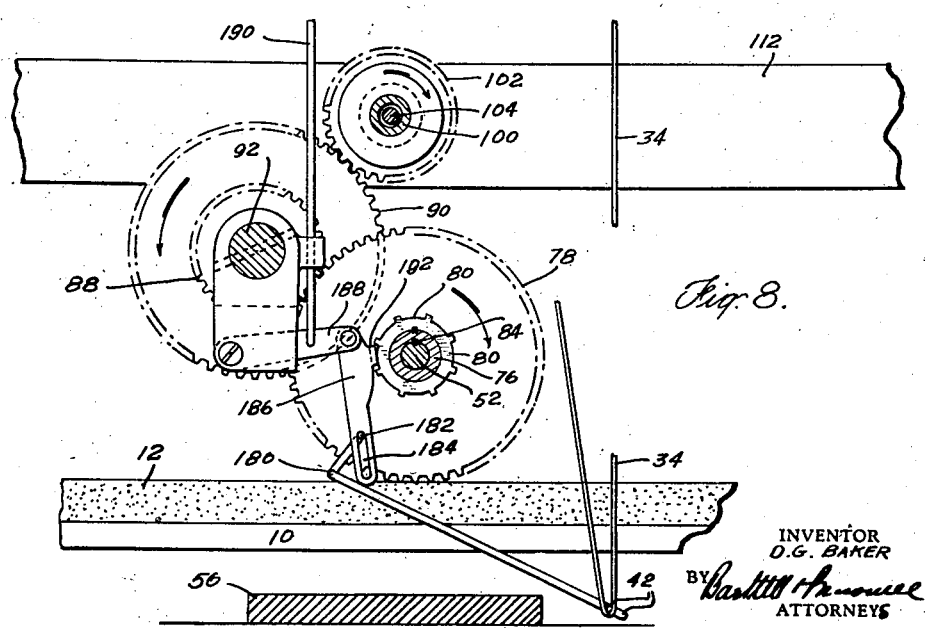
Fig. 8 shows certain details of the stop mechanism for stopping the winding element when its thread breaks, the same being on the line 8—8, Fig. 7.

*Throw-off mechanism:*—In order to provide means for interrupting the action of the head in case the thread breaks I provide a throw-off mechanism consisting of the rod 42, Figs. 3, 7 and 8, under which the thread passes, the same being pivotally mounted at 180 and having a crank pin 182 movable within a slot 184 in a link 186 pivotally connected to a lever 188 but which is connected to a vertical rod 190. The link 186 is provided with a tooth 192, which when the rod 42 is in normal position is out of engagement with the teeth of the star cam 80, Fig. 3. When, however, the thread breaks and the rod 42 falls downward to the position shown in Fig. 8, the tooth 192 is engaged by the teeth of the star cam 80 which, running in clockwise direction, forces the lever 188 and rod 190 upward, moving the detent 196 so as to release the pawl 172. The upper end of the rod 190 is provided with a cam 194, Figs. 1 and 13, having a beveled upper surface which engages the arm 196 of a detent having a notch 198 engaging the free end of the pawl 172 which is pivotally connected at 200 to one end of the bell crank 202, the other end carrying the detent 196. A leaf spring 204 engaging the detent 196 and the pawl 172 tends to hold the notch 198 upon the end of the pawl 172 and also to move the pawl 172 relatively to the bell-crank 202 when it is released by the detent 196. Thus when the thread breaks, the pawl 172 is released so that it is no longer rigidly connected to the shaft 166 but permits that shaft to be moved under the action of the spring 178 to the position shown in Fig. 15, thus withdrawing the friction disk 73 away from the surface 12 and stopping the head irrespective of the position of the timing disk 174.

The lever 162 acting upon the cam 160 restores the pawl 172 from the position shown in Fig. 15 to substantially normal position so as to be caught and restrained by the detent 196. Thus, the lever 162 moves the shaft 166 clockwise after the notch 176 of the timing device has passed out of alinement with the nose of the pawl 172. The pawl 172 then strikes a fixed pin 206 which on account of the movement of the arm 202 causes the free end of the pawl lever 172 to move into substantially the position to engage the notch 198. In order to provide that it shall be moved fully into a position behind said notch 198, the cam 160, at its end, is provided with a projection 208, Figs. 2 and 16, which causes the end 173 of the pawl to be sufficiently withdrawn, as shown in Fig. 16, to insure the desired engagement.

When the friction disk 73 is withdrawn from the surface 12 it comes in contact with a brake-shoe 210, Fig. 7, carried by an arm 212 clamped to the base 56 of the head so that the movement of the friction disk and the parts driven thereby is immediately stopped.

The package while being wound does not come into direct contact with the rotary thread guide but is spaced away therefrom by a bridge or thread separator 214. This thread separator is a tapered member, as shown in Figs. 3 and 5, and is integral with a sleeve 216 which is rotatably mounted upon a hub 218 on the base of the head. The edge of this separator acts in conjunction with the slot 46 in the rotary guide to make the turns at the ends of the traverses sharper and more definite. As the package increases in size this separator must be retracted slightly from the initial position. Thus as the package increases in size it must be moved anti-clockwise, as shown in Fig. 5. This is accomplished by providing the sleeve 216 with a projecting arm 220 and connecting it by a link 222 to an extension 224 on the lower end of the bracket 94.

The rotary guide is provided with a slot having two inclined portions meeting at an angle, as shown in Fig. 7, forming four successive surfaces which successively guide the thread. These guide surfaces are parallel and where they approach the ends of the guide are sharply inclined toward one another, presenting an obtuse angle as viewed from the top, as shown in Figs. 7 and 12. Preferably the intermediate walls of the slot are spaced away a considerable distance in order to render the guide self-cleaning. They are, however, at points adjacent to the obtuse angles narrowed up to approximately the width of the thread so as to guide it more accurately during the period when the angles at the ends of the traverse are being formed, thus preventing overthrow.

The yoke member 168 pivotally mounted on rod 166, is adjusted by means of screws 169 carried in the forked member which is secured to shaft 166.

If it is desired to permanently throw any particular head out of operation, the yoke 168 of that head can be adjusted by means of the adjusting screws 169, Fig. 7, so that the friction disk 73 of that particular head will not be brought into contact with the surface 12 of the driving wheel at any time.

*Yardage measuring.*—In order to drive the timing disk 174 so that it will make one revolution when the desired yardage has been wound, it is mounted upon a shaft 226 which is driven through two sets of worm gearing 228 and 230 by the shaft of the pulley 40 around which the thread passes. With proper gearing the timing disk 174 will make one revolution for 3200 yards of thread passing, and as before explained, interrupt the action of the head after that amount of yardage has been wound. The disk 174 is preferably frictionally driven so that if the pawl 172 should fail to be disengaged no damage would be done. To accomplish this the shaft 226 is provided with a shoulder 232 against which the timing device 174 is forced by the friction member 234 splined to the shaft and held in engagement by the compression spring 236.

The operation of the apparatus is as follows: The turret table 6 and the drive wheel 10 rotate continuously. As a winding head comes toward the front of the machine where the operator is stationed the timing disk 174, after the winding of the desired yardage has been completed, permits the friction disk 73 to be separated from the drive wheel 10 so as to stop the mechanism of the winding head. Thereafter, the lifting cam 126 lifts the bracket 96 together with the spindle and package thereon into doffing position, as shown in Fig. 3. With the parts in this position the package is manually doffed by the operator and a new mandrel is manually placed upon the spindle, the mandrel clutch being at that time in released position. As the turret moves further, the cam 154 releases the friction shoe connected to the bracket 96 and thereupon the cam 128 draws the bracket 96 downward to winding position, whereupon the mandrel is clamped and the cam surface 160 acting through the lever 162 moves the friction disk 73 into engagement with the driving wheel and holds it there until the timing disk 174 has taken control. Thereupon the head, under normal conditions, continues to wind until the desired yardage has been supplied, whereupon the winding is interrupted and the cycle repeated. In case the thread breaks the throw-off mechanism acting through the rod 42 controlling the action of the star cam 80 results in the freeing of the pawl 172, permitting the friction wheel to be disengaged from the driving wheel. If a thread breaks the incomplete package when it reaches doffing position is allowed to remain on the spindle and the two ends are tied together whereupon the winding proceeds until stopped by the yardage measuring device.

The timing disk 174 rotates continuously so long as its winding head is in operation and does not have to be reset either when a package is completed or the thread breaks.

As will be evident to those skilled in the art, my invention permits various modifications without departing from the spirit thereof or the scope of the appended claims.

What I claim is:

1. In a winding machine, the combination of a turret rotatable about a vertical axis, a driving wheel having a vertical friction surface and mounted to rotate concentrically therewith, a plurality of winding heads mounted on said turret each having a vertical friction actuating wheel rotating on a horizontal axis and engaging said driving wheel and driven frictionally thereby during the winding operation of its head, means for rotating said turret slowly and rotating said driving wheel rapidly, means for moving said friction wheel axially into and out of engagement with said friction surface, and a spindle concentric with said friction wheel.

2. In a winding machine, the combination of a rotatable turret, a driving wheel mounted to rotate concentrically therewith, a plurality of winding heads mounted on said turret each having a friction actuating wheel engaging said driving wheel and driven frictionally thereby during the winding operation of its head, and means for rotating said turret slowly and rotating said driving wheel rapidly, and means for automatically moving said friction wheel into engagement with said driving wheel when the head reaches a certain point, a device associated with each winding head for measuring the thread as it is wound, and means controlled by said measuring device for moving said friction wheel out of engagement with said driving wheel when a predetermined yardage has been wound.

3. In a winding machine, the combination of a rotatable turret, a driving wheel mounted to rotate concentrically therewith, a plurality of winding heads mounted on said turret each having a friction actuating wheel engaging said driving wheel and driven frictionally thereby during the winding operation of its head, and means for rotating said turret slowly and rotating said driving wheel rapidly, and means for automatically moving said friction wheel into engagement with said driving wheel when the head reaches a certain point, a device associated with each winding head for measuring the thread as it is wound, and means controlled by said measuring device for moving said friction wheel out of engagement with said driving wheel when a predetermined yardage has been wound, and means for moving the friction wheel of any head out of engagement with said driving wheel when its thread breaks.

4. In a winding machine, the combination of a rotatable turret, a driving wheel mounted to rotate concentrically therewith, a plurality of winding heads mounted on said turret each having a friction actuating wheel engaging said driving wheel and driven frictionally thereby during the winding operation of its head, and means for rotating said turret slowly and rotating said driving wheel rapidly, and means for automatically moving said friction wheel into engagement with said driving wheel when the head reaches a certain point, and means for moving said friction wheel out of engagement with said driving wheel when a predetermined yardage has been wound, said latter means comprising a yardage measuring device, a timing disk and a controlling lever governed by said disk.

5. In a winding machine, the combination of a rotatable turret, a driving wheel mounted to rotate concentrically therewith, a plurality of winding heads mounted on said turret each having a friction actuating wheel engaging said driving wheel and driven frictionally thereby during the winding operation of its head, and means for rotating said turret slowly and rotating said driving wheel rapidly, each winding head having a rotary thread guide and a winding spindle, and means for automatically moving said spindle away from said guide when the winding thereon is completed, and yielding means for moving said spindle toward said thread guide at substantially the time the winding begins.

6. In a winding machine, a slotted rotary guide, a spindle for the package to be wound, and a separator holding the package away from said guide during the winding period, and means for retracting said separator as the package increases in size.

7. In a winding machine, a slotted rotary thread guide, a spindle support pivoted at a point eccentric to said guide, a spindle rotatably mounted in said support, and gearing connecting said spindle and guide and having a gear concentric with the pivotal axis of said support so as to permit the spindle to move about said pivotal axis in a direction away from said thread guide during the winding operation.

8. In a winding machine, the combination of a turret, a plurality of winding heads mounted thereon, each having a rotary thread guide and a spindle movable toward and away from said guide, a driving wheel rotatably mounted concentric with said turret, and simultaneously in operative relation with a plurality of said heads, yardage measuring means for each head, and means controlled by each yardage measuring means for disconnecting its head from said driving wheel after a predetermined yardage has been wound and a cam acting to move the spindle of each driving head away from said guide after the winding thereon is completed.

9. In a winding machine, the combination of a turret, a plurality of winding heads mounted thereon, each having a rotary thread guide and a spindle movable toward and away from said guide, a driving wheel rotatably mounted concentric with said turret, and simultaneously in operative relation with a plurality of said heads, yardage measuring means for each head, and means controlled by each yardage measuring means for disconnecting its head from said driving wheel after a predetermined yardage has been wound and a cam acting to move the spindle of each driving head away from said guide after the winding is completed, and a second cam for subsequently moving said spindle toward said guide.

10. In a winding machine, the combination of a turret, a plurality of winding heads mounted thereon, each having a rotary thread guide and a spindle movable toward and away from said guide, a driving wheel rotatably mounted concentric with said turret, and simultaneously in operative relation with a plurality of said heads, yardage measuring means for each head, and means controlled by each yardage measuring means for disconnecting its head from said driving wheel after a predetermined yardage has been wound, a cam acting to move the spindle of each driving head away from said guide when the winding thereon is completed, a second cam for subsequently moving said spindle toward said guide, and a friction shoe acting as a drag against the movement of said spindle away from said guide as the package increases in size during the winding period.

11. In a winding machine, the combination of a turret, a plurality of winding heads mounted thereon, each having a rotary thread guide and a spindle movable toward and away from said guide, a driving wheel rotatably mounted concentric with said turret, and simultaneously in operative relation with a plurality of said heads, yardage measuring means for each head, and means controlled by each yardage measuring means for disconnecting its head from said driving wheel after a predetermined yardage has been wound, a cam acting to move the spindle of each driving head away from said guide when the winding is completed, and a second cam for subsequently moving said spindle toward said guide, a friction shoe acting as a drag against the movement of said spindle away from said guide as the package increases in size during the winding period, and means for withdrawing said friction shoe after said first cam has acted and before said second cam has acted.

12. In a winding machine, the combination of a turret, a plurality of winding heads mounted thereon, each having a rotary thread guide and a spindle movable toward and away from said guide, a driving wheel rotatably mounted concentric with said turret, and simultaneously in operative relation with a plurality of said heads, yardage measuring means for each head, each yardage measuring means disconnecting its head from said driving wheel after a predetermined yardage has been wound thereon, a cam acting to move the spindle of each driving head away from said guide when the winding is completed, a second cam for subsequently moving said spindle toward said guide, a cam for establishing a driving connection between said head and driving wheel for a period, and means coacting with said yardage measuring means for maintaining said connection after said period has passed.

13. In a winding machine, a driving wheel, a disk driven thereby, a rotary thread guide driven by said disk and concentric therewith, a bracket pivotally mounted eccentric to the axis of said disk and guide, a spindle carried by said bracket, gears connecting said guide and spindle, one of which is concentric with the pivotal axis of said bracket, a yardage measuring device, means controlled by said measuring device for disconnecting said disk from said driving wheel after a predetermined yardage has been wound on said spindle, means for thereafter moving said bracket and spindle away from said guide to package doffing position, means for thereafter moving said spindle toward said guide to winding position, and means for moving said disk into engagement with said driving wheel to rotate said spindle during the winding period.

14. In a winding machine, a driving wheel, a disk driven thereby, a rotary thread guide driven by said disk and concentric therewith, a bracket pivotally mounted eccentric to the axis of said disk and guide, a spindle carried by said bracket, gears connecting said guide and spindle, one of which is concentric with the pivotal axis of said bracket, a yardage measuring device, means controlled by said measuring device for disconnecting said disk from said driving wheel after a predetermined yardage has been wound on said spindle, means for thereafter moving said bracket and spindle away from said guide to package doffing position, means for thereafter moving said spindle toward said guide to winding position, and means for moving said disk into engagement with said driving wheel to rotate said spindle during the winding period, and a counter-balance for part of the weight of said spindle and bracket, said counter-balance exerting a greater force as the package increases in size.

15. In a winding machine having a normally rotating spindle, and a knock-off for stopping the spindle when the thread being wound breaks, the combination of a driving wheel having a friction surface, a friction disk driven thereby, means tending to retract said disk from said wheel, a timing disk, a pawl controlled by said disk for holding said disk in contact with said wheel, a detent for said pawl, a yardage measuring device actuating said disk, and means controlled by said knock-off device for withdrawing said detent when the thread breaks.

16. In a winding machine, a rotary thread guide and spindle, a drive wheel for the guide and spindle, a cam for establishing operative connection between said spindle and said drive wheel, during the starting period, a yardage measurer, and means controlled by the yardage measurer maintaining said connection when made until a predetermined yardage has been wound and thereafter interrupting said connection.

17. In a winding head, means comprising a lever adapted to start and stop the head upon movement of the lever in opposite directions respectively, said lever tending to move to stopping position, a yardage measurer comprising a timing disk actuated by the thread being wound, and means comprising a cam acting automatically a predetermined interval of time after stoppage of the head to move said lever to starting position, said timing disk being adapted to thereafter hold said lever in said position until said disk has rotated a predetermined distance, and then releasing said lever.

18. In a winding head, means comprising a lever adapted to start and stop the head upon movement of the lever in opposite directions respectively, said lever tending to move to stopping position, a yardage measurer comprising a timing disk actuated by the thread being wound, means comprising a cam acting automatically a predetermined interval of time after stoppage of the head to move said lever to starting position, said timing disk being adapted to thereafter hold said lever in said position until said disk has rotated a predetermined distance, and then releasing said lever, and a knock-off mechanism for releasing said lever to move to stopping position when the thread being wound breaks.

19. A yardage measuring device comprising a timing disk actuated by the thread being wound and provided with an indentation in its periphery, a head comprising a pawl engaging said periphery and adapted to enter said indentation, a shaft carrying said head, a lever on said shaft, means comprising a cam acting automatically at predetermined intervals of time for retracting said pawl from said indentation and starting said disk, and means for causing said pawl to enter said indentation when in register therewith, and winding means controlled by said pawl and timing disk.

20. A yardage measuring device comprising a timing disk actuated by the thread being wound and provided with an indentation in its periphery, a head comprising a pawl engaging said periphery and adapted to enter said indentation, a shaft carrying said head, a lever on said shaft, means comprising a cam acting automatically at predetermined intervals of time for retracting said pawl from said indentation and starting said disk, and means for causing said pawl to enter said indentation when in register therewith, and winding means controlled by said pawl and timing disk, said pawl being pivotally connected to said head, a detent carried by said head and normally holding said pawl fixed relatively thereto, and means for releasing said detent from said pawl when the thread breaks so as to permit the body of said head to move toward said disk, winding means controlled by said pawl and timing disk.

21. In a winding machine a base, an elongated hollow trunnion supported thereby, a shaft passing through said trunnion, a bearing within one end of said trunnion for one end of said shaft, a laterally movable sleeve on the other end of said trunnion, a friction disk splined to said shaft and movable laterally thereon, said friction disk having a bearing supported by said movable sleeve, a drive wheel and means for moving said sleeve so as to move said friction disk into engagement with said drive wheel.

22. In a winding machine a base, an elongated hollow trunnion supported thereby, a shaft passing through said trunnion, a bearing within one end of said trunnion for one end of said shaft, a laterally movable sleeve on the other end of said trunnion, a friction disk splined to said shaft and movable laterally thereon, said friction disk having a bearing supported by said movable sleeve, a drive wheel and means for moving said sleeve so as to move said friction disk into engagement with said drive wheel, and means for holding said friction disk for a period in engagement with said drive wheel, comprising a yardage measuring device and timing disk actuated thereby.

23. In a winding machine, the combination of a winding head, a yardage measurer therefor having a timing disk, and means controlled by said disk for stopping said head when a given yardage has been wound, said timing disk during successive winding cycles revolving progressively from the position in which it stops when said winding head is stopped by said yardage measurer, and means acting automatically after a predetermined period of rest to again throw the winding head into operation.

24. In a winding machine, the combination of a winding head, a yardage measurer therefor having a timing disk, and means controlled by said disk for stopping said head when a given yardage has been wound, said timing disk during successive winding cycles revolving progressively from the position in which it stops when said winding head is stopped by said yardage measurer, a turret carrying said head, and a fixed cam for starting said winding head for a new winding cycle.

25. In a winding machine, the combination of a winding head, a yardage measurer therefor having a timing disk, means controlled by said disk for stopping said head when a given yardage has been wound, said timing disk during successive winding cycles revolving progressively from the position in which it stops when said winding head is stopped by said yardage measurer, a turrent carrying said head, and a fixed cam for starting said winding head for a new winding cycle, a knock-off controlling said stopping means so as to stop said head when the thread breaks and co-operating with said timing disk, and means comprising a fixed cam for automatically resetting said knock-off as the turret revolves after said thread is tied.

26. In a winding machine the combination of a continuously rotating turret, a plurality of winding heads carried by the turret, a yarn measuring device associated with each winding head, driving means for each winding head, and means controlled by each measuring device for stopping the operation of the associated winding head when a predetermined yardage has been wound thereby, and means acting automatically thereafter and during the continued rotation of the turret to render said driving means operative to again drive the head.

DICKERSON G. BAKER.

CERTIFICATE OF CORRECTION.

Patent No. 1,962,757. June 12, 1934.

DICKERSON G. BAKER.

It is hereby certified that error appears in the printed specification of the above numbered patent requiring correction as follows: Page 1, line 106, for "hereafter" read hereinafter; page 5, line 84, claim 12, before "each" second occurrence, insert the words and means controlled by; and line 85, same claim, before "disconnecting" insert for; and page 6, line 126, claim 25, for "turrent" read turret; and that the said Letters Patent should be read with these corrections therein that the same may conform to the record of the case in the Patent Office.

Signed and sealed this 24th day of July, A. D. 1934.

Bryan M. Battey (Seal) Acting Commissioner of Patents.